US008131019B2

(12) United States Patent
Miller et al.

(10) Patent No.: US 8,131,019 B2
(45) Date of Patent: Mar. 6, 2012

(54) METHOD AND SYSTEM FOR CAPTURING IMAGES MOVING AT HIGH SPEED

(75) Inventors: John P. Miller, Shelton, CT (US); Lun Chan, New Fairfield, CT (US); William A. Brosseau, Stratford, CT (US)

(73) Assignee: Pitney Bowes Inc., Stamford, CT (US)

( * ) Notice: Subject to any disclaimer, the term of this patent is extended or adjusted under 35 U.S.C. 154(b) by 1182 days.

(21) Appl. No.: 11/869,877

(22) Filed: Oct. 10, 2007

(65) Prior Publication Data

US 2009/0097703 A1 Apr. 16, 2009

(51) Int. Cl.
*G06K 9/00* (2006.01)
*H04N 5/222* (2006.01)

(52) U.S. Cl. .......................................... 382/107; 348/371

(58) Field of Classification Search ........................ None
See application file for complete search history.

(56) References Cited

U.S. PATENT DOCUMENTS

| | | | | |
|---|---|---|---|---|
| 5,321,436 | A | 6/1994 | Herbert | |
| 5,933,179 | A | 8/1999 | Fogle et al. | |
| 5,974,147 | A | 10/1999 | Cordery et al. | |
| 6,363,484 | B1 | 3/2002 | Cordery et al. | |
| 6,435,642 | B1 | 8/2002 | Jackson et al. | |
| 6,612,676 | B1 | 9/2003 | Minckler | |
| 7,104,451 | B1 * | 9/2006 | McCartney | 235/462.01 |
| 2005/0046694 | A1 | 3/2005 | Quine | |
| 2005/0097066 | A1 * | 5/2005 | Nambudiri | 705/401 |
| 2006/0083404 | A1 * | 4/2006 | Shimosato | 382/100 |
| 2007/0181689 | A1 * | 8/2007 | Kotlarsky et al. | 235/462.11 |
| 2009/0097703 | A1 * | 4/2009 | Miller et al. | 382/101 |

OTHER PUBLICATIONS

Pro Mailing Equipement, "Mail Conveyors, Mail Soring Equipment, and Accufast Mail Handling Equipment", http://www.promailingequipment.com/1conveyors.htm Published Sep. 2006, Available on Internet Archive: http://web.archive.org/web/20060901004211/http://www.promailingequipment.com/1conveyors.htm.*

STMicroelectronics, Model VC5602, VC6602 1.23 Megapixel digital video CMOS image sensor, Data Brief, Feb. 2007.

* cited by examiner

*Primary Examiner* — Bhavesh Mehta
*Assistant Examiner* — Tahmina Ansari
(74) *Attorney, Agent, or Firm* — Brian A. Lemm; Charles R. Malandra, Jr.; Steven J. Shapiro

(57) ABSTRACT

An image of a moving object, such as a postage indicium barcode on a mail piece, is captured with the object in motion (e.g., while being transported through a mailing machine). An array of CMOS picture elements is held in a reset condition. A signal asserted on control pin ends the reset condition and places the picture elements in an image capture condition. With the picture elements in a picture capture condition, a strobe light is actuated at a time when the barcode is predicted to be present at the picture element array. After the strobe light has been actuated, the signal on the control pin is de-asserted to initiate a read-out of the image data from the picture elements.

6 Claims, 4 Drawing Sheets

METHOD AND SYSTEM FOR CAPTURING IMAGES MOVING AT HIGH SPEED

BACKGROUND

This invention relates generally to the field of mailing machines, and more particularly to a mailing machine that has capabilities for detecting and responding to errors in printing postage indicia.

Generally, a mail piece transport on a mailing machine transports envelopes and other mail pieces along a transport path so that various functions may be performed on the mail piece at different locations along the transport path. For example, at one location along the transport path the mail piece may be weighed, at another location the mail piece may be sealed, and at a further location an indicium for postage may be applied to the mail piece. Drive rollers and/or drive belts may be employed to contact the mail piece to propel the mail piece along the transport path. The postage indicium may be applied by printing with a printing device on the mail piece. The printing device is coupled to a postage security device (PSD) which holds postage funds and dispenses funds by causing the printing device to print the postage indicia. The PSD performs accounting functions to account for the dispensing of funds via the printing of postage indicia. The accounting functions include deducting funds from the amount of postage stored in the PSD in regard to each postage indicium printed by the printing device.

In accordance with some proposals, the postage indicium may contain a barcode or other machine-readable data to aid in verification of the validity of the postage indicium. One such postage indicium is defined in the Information-Based Indicia Program (IBIP) promulgated by the U.S. Postal Service.

Mailing machines are often run at high speed, and may handle batches consisting of thousands of mail pieces within a relatively short time. To the extent that operation of the mailing machine is attended by a human operator, often the operator's attention is concerned with feeding mail pieces into the mailing machine or with other tasks, and the operator may not have an opportunity to closely monitor the condition of mail pieces upon completion of processing of the mail pieces by the mailing machine. In particular, even if operation of the mailing machine is attended by a human operator, the operator may not be able to quickly and readily detect malfunctions of the postage meter printing device that may result in improper printing of postage indicia on mail pieces that are being processed by the mailing machine. Detection of improper printing may be of particular importance if the printing device is an ink jet printer, as has been proposed.

Failure of the printing device to properly print postage indicia may occur for a number of reasons. For example, improper printing or non-printing of indicia may occur due to one or more clogged ink nozzles or jets, or due to one or more ink jets being burned out, or because of a failure in the supply of ink to the print head. The printing device may also be subject to electronic failures.

Even a minor failure of the printing device may interfere with printing of the indicium barcode to an extent such that the indicium would fail a verification procedure that may be performed by postal authorities.

In at least some cases, occurrence of a failure in the printing device may not be known to the PSD. Consequently, the PSD may continue to direct the printing device to print indicia on mail pieces, as mail pieces are transported in sequence through the mailing machine, and may continue to deduct funds from the postage stored in the PSD, even at times when the printing device is failing to print a proper indicia on mail pieces transported past the printing device. This may have the effect of charging the proprietor of the mailing machine for postage even though the corresponding postage indicia were not effectively applied to the mail pieces. There may be no way for the proprietor of the mailing machine to recover the postage amounts which the PSD considered to have been dispensed, even though the postage was not applied to the mail pieces. Thus the failure or improper operation of the printing device may result in substantial financial loss to the proprietor of the mailing machine, particularly if large batches of mail are processed at high speed by a mailing machine in which the printing device has failed.

In view of the foregoing, it has been proposed (e.g., in U.S. published patent application no. 2005/0097066) to include a reading device in a mailing machine to read at least some of the postage indicia to confirm that the indicia are being printed with adequate print quality.

It is frequently a desirable feature of a mailing machine that it be capable of processing a large number of mail pieces in a relatively short time, say well upward of 10,000 pieces per hour. To accomplish this sort of processing speed, it may be necessary for the mail piece transport to move the mail pieces at a relatively fast speed, say on the order of 100 to 120 inches per second. However, operation at such speed may present a challenge with respect to capturing images of the indicia for the purpose of confirming the print quality of the indicia. It would be inconsistent with desired high speed operation of the mailing machine to slow down or pause transport of the mail pieces to aid in capturing images of the indicia, yet conventional approaches to capturing images moving at such high speeds are likely to require expensive hardware that would raise the manufacturing cost of the mailing machine to a potentially unacceptable degree.

SUMMARY

Accordingly, the present invention provides an improved method for capturing an image of an object while the object is in motion. The method includes holding an array of CMOS picture elements in a reset condition. Further, the method includes asserting a signal on a reset control pin to end the reset condition and to place the CMOS picture elements in an image capture condition in which the CMOS picture elements integrate received radiation to generate image data. In addition, while the picture elements are in the image capture condition, a strobe light is actuated at a time when the object is predicted to be adjacent the array of CMOS picture elements. The strobe light may be formed of one or more light emitting diodes (LEDs). After the strobe light has been actuated, the signal on the reset control pin is de-asserted to initiate read-out of the image data from the CMOS picture elements. The method may further include shading the picture elements from ambient light.

The object may be a two-dimensional barcode printed on a mail piece, and may be moving at a speed in the range of substantially 100 inches per second to 120 inches per second.

The method may further include printing the two-dimensional barcode on the mail piece, predicting when the two-dimensional barcode will be adjacent the array of CMOS picture elements based on a time when the two-dimensional barcode was printed, and transporting the mail piece from a printing device to the array of CMOS picture elements.

Therefore, it should now be apparent that the invention substantially achieves all the above aspects and advantages. Additional aspects and advantages of the invention will be set forth in the description that follows, and in part will be obvious from the description, or may be learned by practice of the invention. Various features and embodiments are further described in the following figures, description and claims.

DESCRIPTION OF THE DRAWINGS

The accompanying drawings illustrate presently preferred embodiments of the invention, and together with the general description given above and the detailed description given below, serve to explain the principles of the invention. As shown throughout the drawings, like reference numerals designate like or corresponding parts.

DETAILED DESCRIPTION

The image capture method described herein may allow the image capture elements of a low-cost digital camera, or similar imaging technology, to be applied to capturing images of postage indicia barcodes on mail pieces while the mail pieces are being transported at high speeds through a mailing machine.

Figure 1:
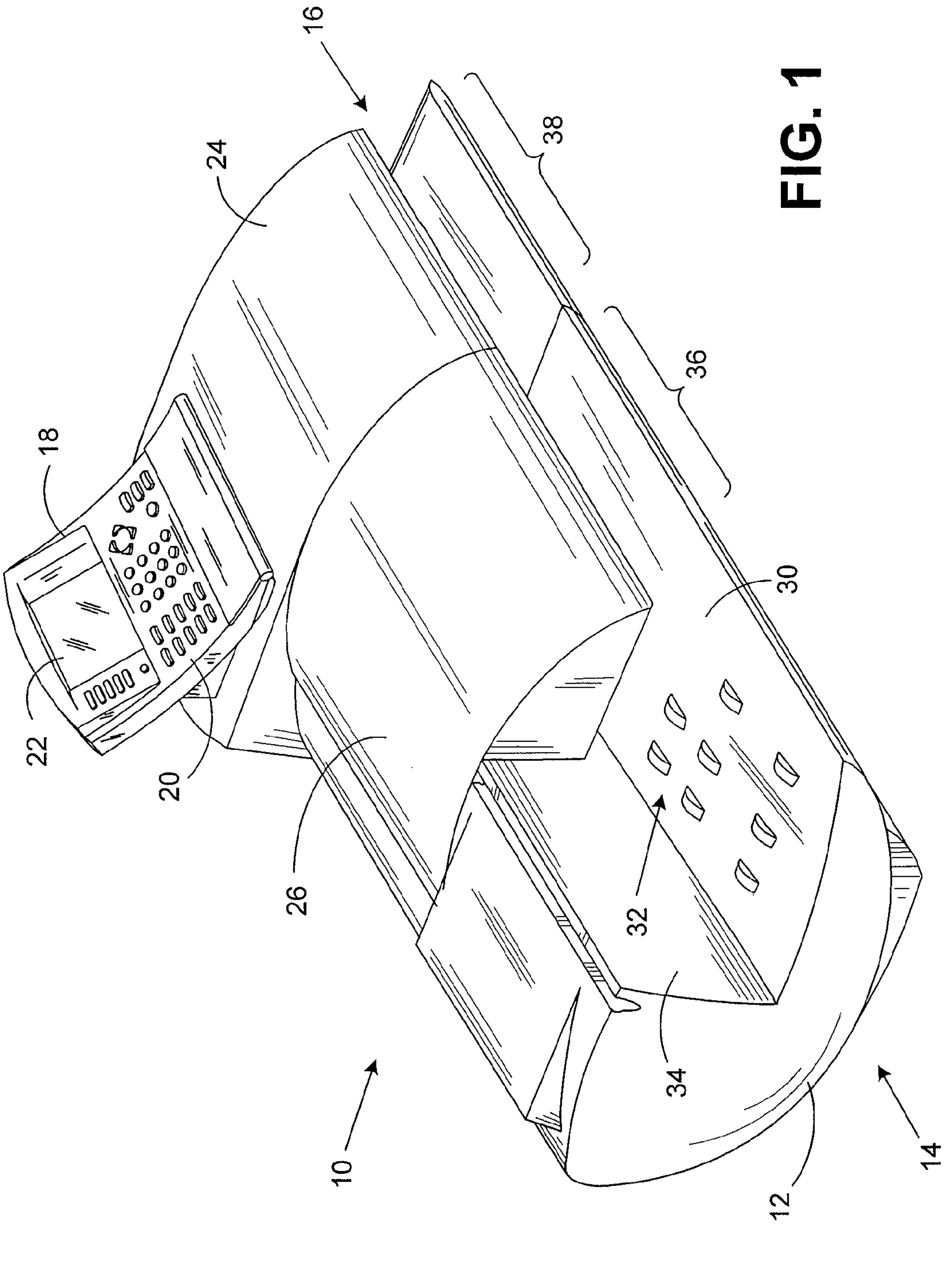
FIG. 1 is a perspective view of a typical mailing machine constructed and arranged in accordance with the principles of the present invention.

Referring now to the drawings, and particularly to FIG. 1, the reference numeral 10 indicates generally a typical mailing machine which incorporates the principles of the present invention. The mailing machine 10 includes a base unit generally designated by the reference numeral 12. The base unit 12 has an envelope infeed end, generally designated by the reference numeral 14, and an envelope outfeed end, designated generally by the reference numeral 16. A control unit 18 is mounted on the base unit 12, and includes one or more input/output devices, such as, for example, a keyboard 20 and a display device 22. A PSD (postage security device), which is not separately shown, may be contained within the control unit 18.

Cover members 24, 26 are pivotally mounted on the base 12 and are moveable between a closed position shown in FIG. 1 and an open position (not shown). In the open position of the cover members 24, 26, various operating components and parts are exposed for service and/or repair as needed. A mail piece transport mechanism which is not visible in FIG. 1 is housed under the cover members 24, 26.

The base unit 12 further includes a generally horizontal feed deck 30 which extends substantially from the infeed end 14 to the outfeed end 16. A plurality of nudger rollers 32 are suitably mounted under the feed deck 30 and project upwardly through openings in the feed deck so that the rollers 32 can exert a forward feeding force on a succession of mail pieces placed in the infeed end 14. A vertical wall 34 defines a mail piece stacking location from which the mail pieces are fed by the nudger rollers 32 along the feed deck 30 and into the transport mechanism referred to above. The transport mechanism transports the mail pieces through one or more modules, such as, for example, a separator module and moistening/sealing module. Each of these modules is located generally in the area indicated by reference numeral 36, and is not visible in the drawing. The mail pieces are then passed to a printing module located generally in the area indicated by reference numeral 38. A barcode image capture module, to be discussed below, may be located in the area 38 downstream from the printing module. The barcode image capture module and printing modules also are not visible in FIG. 1.

Figure 2:
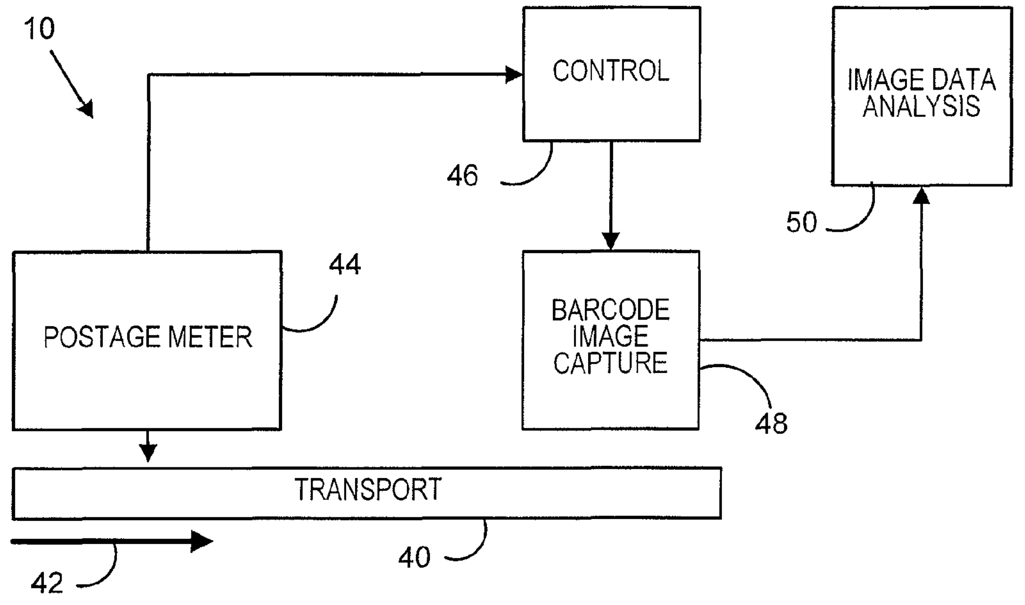
FIG. 2 is a block diagram of aspects of the mailing machine of FIG. 1.

FIG. 2 is a block diagram representation of aspects of the mailing machine 10. As depicted in FIG. 2, the mailing machine 10 includes a transport mechanism 40, which may be constructed in accordance with conventional principles. For example, the transport mechanism 40 may include one or more drive belts, drive rollers and/or pressure rollers, which are not separately shown. The transport mechanism 40 transports mail pieces (not shown) along a transport path, which is indicated by arrow 42.

The mailing machine 10 also includes a postage meter 44, which includes a printing device (not separately shown) mounted on the mailing machine 10 adjacent the transport path 42. The postage meter prints postage indicia on mail pieces transported along the transport path 42 by the transport mechanism 40. The postage meter 44 also includes a PSD (postage security device; not separately shown) which is coupled to and controls the printing device. In some embodiments, all hardware aspects of the postage meter 44 may be provided in accordance with conventional practices, and the PSD may also control the printing device and may store and account for postage funds in accordance with conventional practices.

The mailing machine 10 also includes a control device 46. The control device 46 may be integrated with an over-all controller (not separately shown) for the mailing machine 10 and may be included in the control unit 18. Alternatively, the control device 46 may be partially or completely dedicated to a barcode image capture module 48, which is also included in the mailing machine 10. The barcode image capture module 48 may be mounted on the mailing machine 10 adjacent the transport path 42 and downstream from the printing device portion of the postage meter.

The mailing machine 10 may further include suitable circuitry 50 to receive and analyze image data generated by and read out from the barcode image capture module 48. The image data analysis circuitry 50 may be incorporated in a controller for the mailing machine as a whole or may be partially or completely dedicated to analyzing barcode image data. The image data analysis circuitry 50 may be constituted by a suitably programmed microprocessor or microcontroller; moreover, all of the controller or data analysis elements referred to herein may be constituted by one or more suitably programmed microprocessors or microcontrollers. The image data analysis circuitry 50 may, for example, be integrated with the control device 46.

Figure 3:
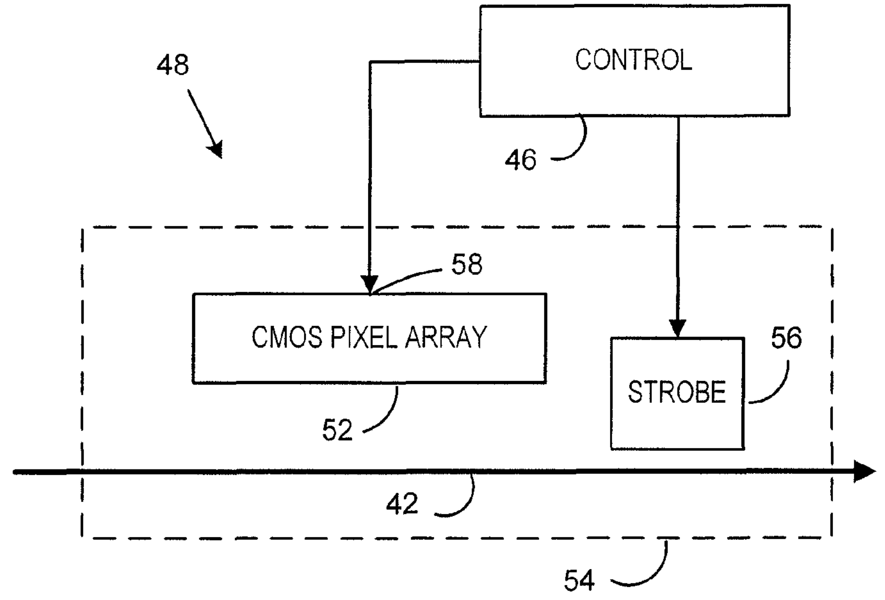
FIG. 3 is another block diagram, showing some details of an image capture module included in the mailing machine.

FIG. 3 is block diagram that shows some details of the barcode image capture module 48.

As seen from FIG. 3, the barcode image capture module 48 may include a CMOS picture element array 52. The CMOS picture element array 52 may, for example, be of a type conventionally included in low cost consumer digital cameras. An example of such a CMOS picture element array, is the model 5602 image sensor available from ST Microelectronics, Geneva, Switzerland. The CMOS picture element array 52 is located adjacent the transport path 42 at a location to receive images of the barcodes included in the postage indicia printed on the mail pieces transported along the transport path 42.

The barcode image capture module 48 may also include an optical system (not shown) including one or more lenses to focus images of barcodes on the CMOS picture element array 52.

Further, the barcode image capture module 48 may include an enclosure 54, in which the CMOS picture element array 52 is located. The enclosure 54 may be substantially light proof, and may for example include the cover 24 referred to above with reference to FIG. 1. Except for openings through which the mail pieces pass into and out of the enclosure 54, the enclosure 54 may substantially completely enclose the CMOS picture element array 52. Accordingly, the enclosure 54 may perform the function of shading the CMOS picture element array 52 from ambient light present in the room (not separately indicated) in which the mailing machine 10 is installed.

In addition, the barcode image capture module 48 may include a strobe light 56. In some embodiments, the strobe light 56 is formed from one or more light emitting diodes (LEDs). In an alternative embodiment, however, a conventional short-duration flash lamp may be used. Nevertheless, an LED-based strobe may be preferable in view of such factors as relatively low cost, and low driving voltage.

Also shown in FIG. 3 is the same control device 46 referred to above in connection with FIG. 2. It will be noted that the control device 46 is coupled to the CMOS picture element array 52 and the strobe light 56 so as to be able to apply control signals to the latter two components. For example, the control device 46 may be coupled to a reset control pin 58 of the CMOS pixel array 52 so as to be able to assert a signal thereon.

Figure 4:
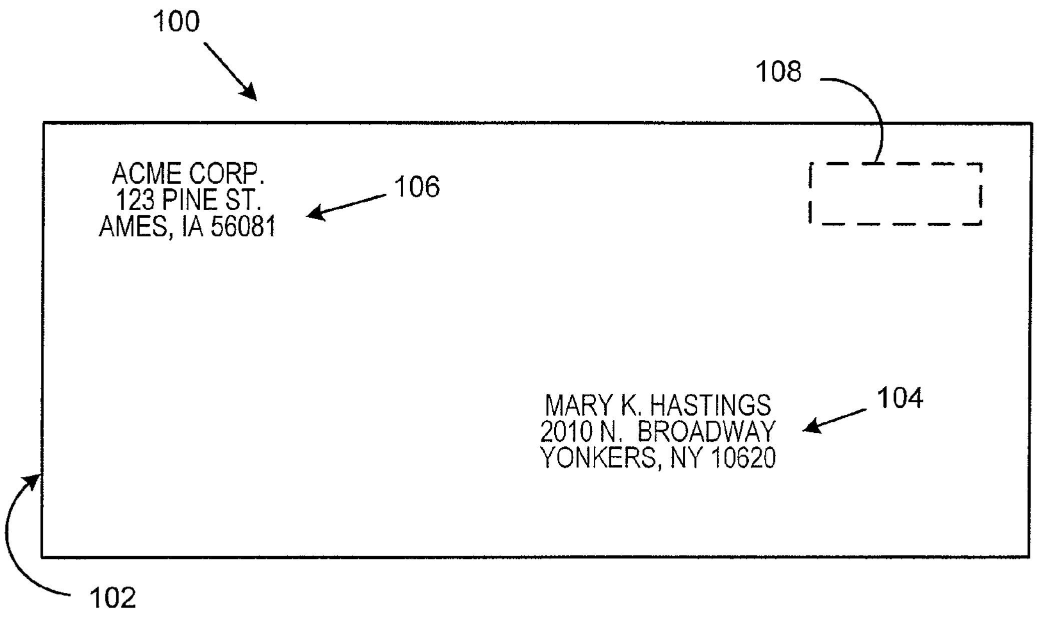
FIG. 4 is a somewhat schematic plan view of a typical mail piece processed by the mailing machine.

FIG. 4 is a somewhat schematic plan view of a typical mail piece 100 processed by the mailing machine 10. The mail piece 100 may take the form of a standard no. 10 envelope, having a destination address 104 and a return address 106 printed thereon. More significantly, for present purposes, the mail piece 100 also has postage indicium that has been printed thereon by the postage meter 44 of the mailing machine 44. To simplify the drawing, the postage indicium is represented by a dashed line rectangle 108 in FIG. 4, but a more detailed illustration of the postage indicium 108 appears in specimen form in FIG. 5.

Figure 5:
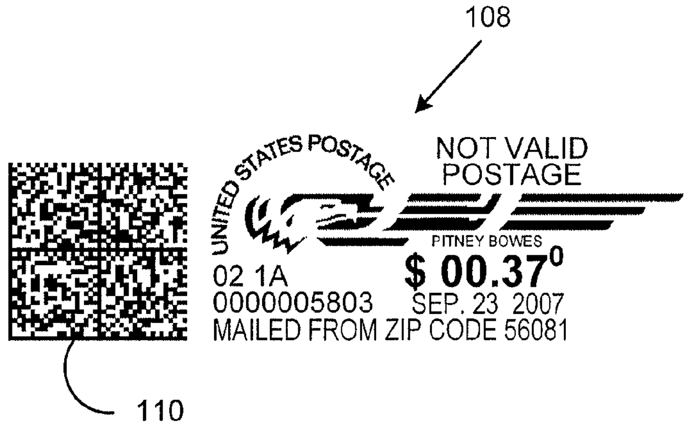
FIG. 5 is a specimen representation of a postage indicia printed on the mail piece of FIG. 4 by the mailing machine.

Referring to FIG. 5, the indicium 108 may include, among other conventional elements, a two-dimensional barcode 110 by which machine-readable data is presented. The indicium 108, and particularly the two-dimensional barcode 110, may generally be in compliance with the "Information-Based Indicia Program" (IBIP) promulgated by the U.S. Postal Service. The two-dimensional barcode 110 may contain high-density variable cryptographically protected information, which may be used for security and marketing purposes. In compliance with the IBIP, the barcode may be based on the well known PDF417 standard.

There will now be described, with reference to FIG. 6, an image capture process performed in the mailing machine 10, according to some embodiments. In particular, FIG. 6 may represent a control process implemented by software and/or firmware to program the control device 46 (FIGS. 2 and 3), and/or by logic circuitry in the control device 46, for the purpose of capturing an image of the two-dimensional barcode 110 from the mail piece 100 while the mail piece is in motion along the transport path 42. To facilitate high throughput by the mailing machine 10, the mail piece may be moving at a speed of about 100 inches per second to about 120 inches per second at the time the barcode image is captured.

Figure 6:
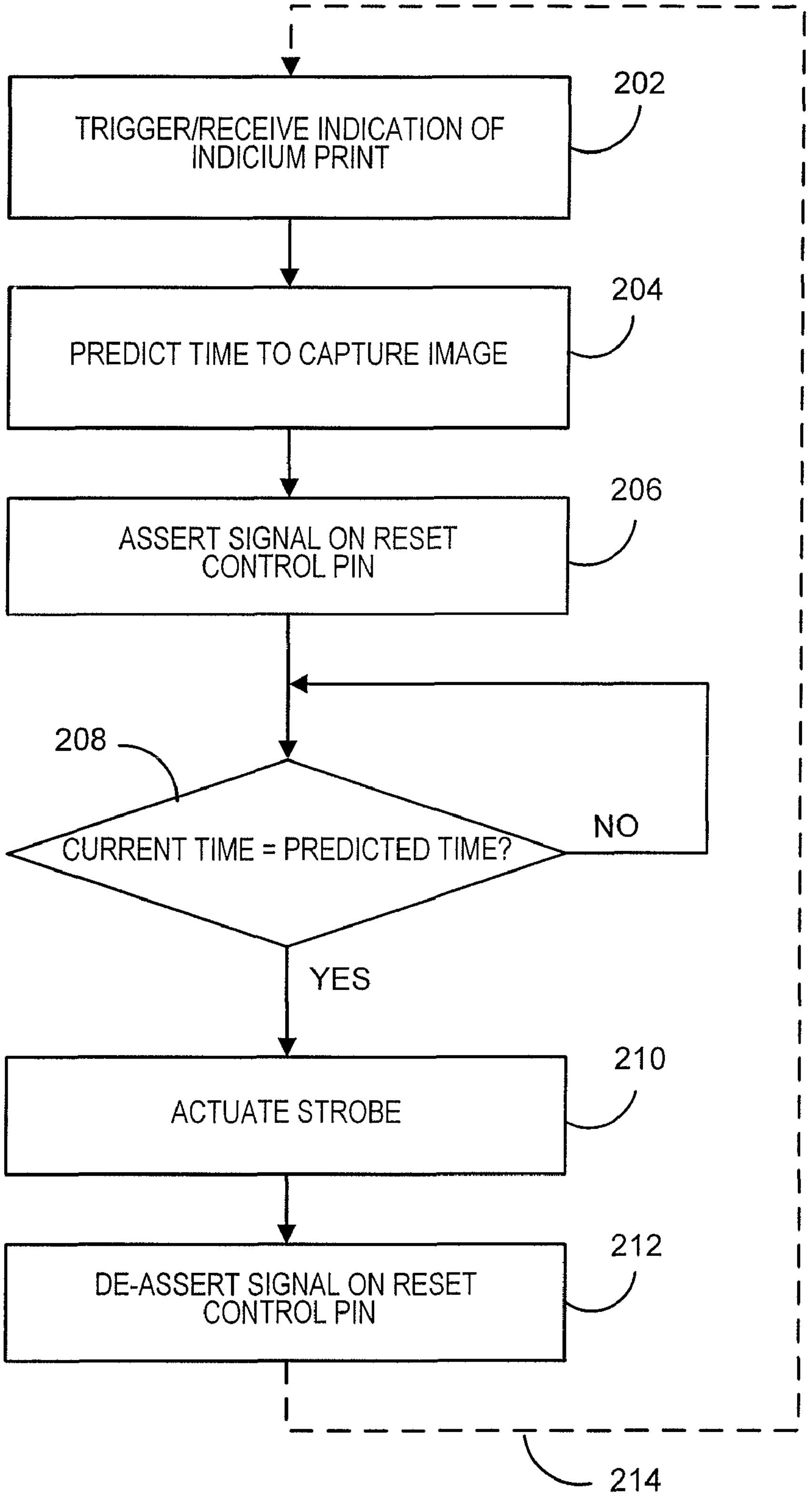
FIG. 6 is a flow chart that illustrates a process that may be performed by a control device that is part of the mailing machine.

At 202 in FIG. 6, the control device 46 may receive an indication of a time at which the postage meter 44 has printed a postage indicium 108 (including a two-dimensional barcode 110). For example, the indication may be provided by the postage meter 44 to the control device 46 simultaneously with the printing of the indicium/barcode. In an alternative embodiment however, such as in the case where the control device is integrated with control circuitry for the postage meter 44, the control device may itself control the timing at which the indicium/barcode is printed. Thus, instead of in effect receiving a report of the printing of the indicium/barcode, the control device 46 may itself trigger the print operation.

Following step 202 is step 204. At step 204 the control device 46 calculates a predicted time at which the barcode will arrive at the locus of the CMOS picture element array 52. The calculation of the predicted time may be based on the time at which the printing of the barcode took place. For example, the predicted time may be calculated by adding a fixed increment to the time at which printing occurred. The increment may be calculated in advance (e.g., during a set-up operation) based on (a) the distance along the transport path 42 from the printing element of the postage meter 44 to the locus of the CMOS picture element array 52, and (b) the speed at which the transport mechanism 40 transports the mail pieces. The data required to calculate the increment may be determined with a high degree of precision by a calibration procedure undertaken during set-up.

At some point before or after the printing of the barcode, but in any event in good time before the predicted time of arrival of the barcode at the CMOS picture element array 52, the control device 46 asserts (step 206) a signal on the reset control pin 58 of the CMOS picture element array 52. Prior to the assertion of the signal by the control device 46, the CMOS picture element array 52 is in a mode in which the elements of the array 52 are held in a reset condition. (In the above mentioned ST Microelectronics model 5602 image sensor, this mode is referred to as a "shutter mode".) By the assertion of the signal on the reset control pin 58, the reset condition is ended and the elements of the array 52 are placed in an image capture mode in which the picture elements integrate any radiation (within the wavelength band that the elements are capable of sensing) received at the picture elements. However, because the inside of the enclosure 54 is substantially dark, substantially no relevant radiation is received at the picture elements until a later stage of the process.

With the picture elements of the array 52 remaining in the image capture mode, the control device 46 waits, as indicated at 208, until the current time has reached the predicted time of arrival of the barcode at the array 52. At the point when the predicted time is reached, the control device 46 transmits a signal to actuate (step 210) the strobe light 56. Upon actuation, the strobe light 56 illuminates the barcode 110 for a brief period of time. For example, if an LED-based strobe light is employed, the period of illumination may be on the order of 30 microseconds. In the case of a conventional strobe, the period of illumination may be about 5 microseconds. Even in the case of the longer period of illumination, the motion of the barcode may be small enough such that the resulting image of the barcode is not significantly smeared or distorted.

During the period of illumination, an image of the barcode is formed on the picture elements of the array 52 so that the picture elements generate image data. Shortly after the period of illumination ends, the control device 46 de-asserts (step 212) the signal on the reset control pin 58 of the CMOS picture element array 52. The de-assertion of the signal initiates reading out of the image data from the array 52. In one embodiment, with a read-out clock rate of 24 MHz, the image data read out may take about 70 milliseconds. With a read-out clock rate of 48 MHz, the image data read out may take about 30 milliseconds. When the image data read out is complete, the picture elements return to the mode in which they are held in the reset condition. Accordingly, as indicated at 214, another cycle of the process may next be performed.

When the image data is read out, it is provided to the image data analysis circuitry 50. The image data analysis circuitry 50 may then perform analysis on the image data to determine whether the two-dimensional barcode was printed properly by the postage meter 44. Such analysis can include, for example, determining if all of the pixels of the two-dimensional barcode desired to be printed have actually been printed. If not, steps may be taken to interrupt operation of the mailing machine.

With the brief but adequate period of illumination provided by the strobe light 56, the quality of the barcode image represented by the image data may be high enough to allow for a reliable analysis of the quality of the printed barcode 110. The hardware components used to construct the barcode image capture module 48 may be of relatively low cost (perhaps only about $10.00 for the CMOS picture element array). Consequently, the method described herein may provide a very low-cost solution to the technical problem of capturing barcode images on mail pieces that are being processed in a high-throughput mailing machine.

In some embodiments, one or more cycles of the process of FIG. 6 may overlap in time with each other. For example, the printing of one indicium, and/or the predicting of its time of arrival at the CMOS picture element array, may occur while the control device is waiting for the previous indicium to arrive at the CMOS picture element array.

In some embodiments, the mailing machine 10 may operate to capture an image and analyze the image for every two-dimensional barcode it prints. In other embodiments, the mailing machine 10 captures images only of some of the two-dimensional barcodes, say on every second, third, fifth or tenth mail piece.

The words "comprise," "comprises," "comprising," "include," "including," and "includes" when used in this specification and in the following claims are intended to specify the presence of stated features, elements, integers, components, or steps, but they do not preclude the presence or addition of one or more other features, elements, integers, components, steps, or groups thereof.

A number of embodiments of the present invention have been described. Nevertheless, it will be understood that various modifications may be made without departing from the spirit and scope of the invention. Accordingly, other embodiments are within the scope of the following claims.

What is claimed is:

1. A method for capturing an image of an object while the object is in motion, the method comprising:

holding an array of CMOS picture elements in a reset condition;

asserting a signal on a reset control pin to end said reset condition and to place said CMOS picture elements in an image capture condition in which the CMOS picture elements integrate received radiation to generate image data;

while the CMOS picture elements are in the image capture condition, actuating a strobe light at a time when the object is predicted to be adjacent the array of CMOS picture elements; and after actuating the strobe light, de-asserting the signal on the reset control pin to initiate read-out of the image data from the CMOS picture elements.

2. The method according to claim 1, further comprising:

shading the array of CMOS picture elements from ambient light.

3. The method according to claim 1, wherein the strobe light is formed of one or more light emitting diodes (LEDs).

4. The method according to claim 1, wherein the object is a two-dimensional barcode printed on a mail piece.

5. The method according to claim 4, further comprising:

printing said two-dimensional barcode on said mail piece;

predicting when the two-dimensional barcode will be adjacent the array of CMOS picture elements based on a time when the two-dimensional barcode was printed; and transporting the mail piece from a printing device to the array of CMOS picture elements.

6. The method according to claim 1, wherein the object is moving at a speed in a range of substantially 100 inches per second to 120 inches per second.

* * * * *